United States Patent [19]

Subramanian

[11] 3,882,433

[45] May 6, 1975

[54] SWIF WITH TRANSDUCERS HAVING VARIED DUTY FACTOR FINGERS FOR TRAP ENHANCEMENT

[75] Inventor: Sundaram Subramanian, Evanston, Ill.

[73] Assignee: Zenith Radio Corporation, Chicago, Ill.

[22] Filed: Feb. 15, 1974

[21] Appl. No.: 442,950

[52] U.S. Cl. .................... 333/72; 310/9.8; 333/30 R

[51] Int. Cl. ........ H03h 9/32; H03h 9/26; H01v 7/00

[58] Field of Search ............. 333/72, 30 R; 310/9.7, 310/9.8

[56] References Cited

UNITED STATES PATENTS

| | | | |
|---|---|---|---|
| 3,376,572 | 4/1968 | Mayo | 333/30 R X |
| 3,688,223 | 8/1972 | Pratt et al. | 333/72 |

OTHER PUBLICATIONS

Toda et al., "Surface Wave Delay Lines With Interdigitated Transducers on Unpolarized PZT Ceramic Plates," in Japanese Journal of Applied Physics, Vol. 6, No. 10, June, 1971, pp. 671–677.

*Primary Examiner*—James W. Lawrence
*Assistant Examiner*—Marvin Nussbaum
*Attorney, Agent, or Firm*—Nicholas A. Camasto; Roy A. Ekstrand

[57] ABSTRACT

An acoustic surface wave filter includes a piezoelectric medium having a propagating surface upon which a transmitting and a receiving transducer are formed, each of which comprises a pair of interdigitated comb-like arrays of spaced electrically conductive fingers. The duty factor is varied at selected portions of the transducer providing, a varied transducer efficiency within the array.

4 Claims, 11 Drawing Figures

SWIF WITH TRANSDUCERS HAVING VARIED DUTY FACTOR FINGERS FOR TRAP ENHANCEMENT

BACKGROUND OF THE INVENTION

Acoustic surface wave filters (SWIF's), being compact, easily reproducible, fixed-tuned frequency selective circuit elements are finding increased favor among circuit designers especially for use in combination with integrated circuits. While varying in construction, SWIF's in general comprise a piezoelectric substrate having a smooth propagating surface upon which a transmitting and a receiving transducer, each comprising a pair of comb-like interdigitated arrays of electrically conductive fingers are formed.

Surface wave generation, propagation and reception are complex phenomena and will be discussed below in greater detail. Nonetheless a brief description at this point will be helpful. The transmitting transducer, when coupled to a source of alternating voltage, applies a corresponding electric field to the medium which, due to its piezoelectric properties, is stressed transforming electric energy into acoustic energy in the form of surface waves which propagate across the medium to the receiving transducer. The receiving transducer, generally similar in construction to the transmitting transducer, reconverts the acoustic energy present in the impinging surface wave back to electrical energy which is supplied to a suitable load.

Due to the number of transducer fingers and their center-to-center spacing, the amplitude response of a SWIF is a function of the applied signal frequency. Signal frequencies generating surface waves having an acoustical wavelength equal to double the center-to-center spacing of the transducer fingers (synchronous frequency $f_o$) receive reinforcement by successively encountered fingers and as a result are maximally coupled. Signals having frequencies remote from that of the maximally coupled synchronous frequency signal are cumulatively cancelled by successively encountered fingers and are as a result attenuated. The inherent frequency response of an interdigitated transducer SWIF device is a (sin $x/x$) function which facilitates its use as a passband filter.

The (sin $x/x$) response is characterized by a major bell-shaped passband symmetrical about a center or synchronous frequency maximum and a series of alternate nulls and peaks of diminishing amplitude on either side thereof which are also symmetrically spaced about the center frequency. While the major passband is suitable for filter application, a more effective filter is produced if the response is enhanced, for example, by sharpening the nulls adjacent the passband which are used to trap undesired signals, and changing the passband to more closely approximate a squared bandpass response, that is, imparting steeper skirts and flattening the region of maximum amplitude. For example, if this enhancement is performed in order to produce a suitable filter for use as an IF filter in a television receiver, the synchronous or center frequency is selected to equal the center frequency of the IF band (approximately 44 MHz) and the adjacent trap responses provide the required adjacent picture trap (39.75 MHz) and adjacent sound trap (47.25 MHz).

Accordingly, it is an object of the present invention to provide a novel improved SWIF device.

It is a further object to provide a novel SWIF having an enhanced transfer function.

It is a still further object to provide a novel SWIF having an enhanced transfer function with improved trap characteristics.

SUMMARY OF THE INVENTION

An acoustic surface wave filter in which surface waves are propagated across a piezoelectric medium from a transmitting transducer to a receiving transducer each of which include a pair of interdigitated comb-like arrays of spaced electrically conductive fingers formed on the surface of the medium. At least one of the transducers has a varied duty factor, resulting in variations of transducer efficiency across the transducer, for augmenting the transfer function of the filter.

BRIEF DESCRIPTION OF THE DRAWINGS

The features of this invention which are believed to be novel are set forth with particularity in the appended claims. The invention, together with its further objects and advantages, may best be understood by reference to the following description taken in conjunction with the accompanying drawings in the several figures of which like reference numerals refer to like elements and in which:

FIG. 1 shows a prior art SWIF device comprising a piezoelectric medium 10 having a propagating surface 16 with a transmitting transducer 11, a receiving transducer 12 and connecting elements 14 deposited thereon. Transducer 11 includes a pair of comb-like arrays of interdigitated conductive fingers (20 through 28 inclusive), whose spacing determines the synchronous or center frequency of the device. A source of alternating signal 18 is coupled via connecting elements 14 to transmitting transducer 11 and a load impedance 19 is similarly coupled to receiving transducer 12. As discussed in the related application Ser. No. 307,887 filed Nov. 20, 1972, now U.S. Pat. No. 3,839,687, entitled "SURFACE WAVE FILTER AND METHOD" in the name of Sundaram Subramanian and assigned to the assignee of the present invention, for a given medium and signal frequency the duty factor of the transducer determines its efficiency and is defined as the ratio of $d$ to $d_o$ where $d_o$ is the distance between successive fingers and $d$ is the width of the finger. The greater the duty factor (within practical limits of 10 to 75 percent), that is, the wider the fingers for any given spacing, the greater the transducer efficiency.

Transducer transfer function is defined as the ratio of the mechanical force of the acoustic wave to the electrical voltage and can be measured indirectly by measuring the driving point admittance ($Y_p = G_p + J X_p$). Assuming that most of the electrical energy applied is converted into mechanical surface wave energy, $G_p$ is a measure of the effectiveness of the transducer. It should be noted that the above assumption is valid if the measurement is performed at a frequency close to the synchronous frequency using transducers with a reasonable number of fingers.

Because the amount of electrical energy converted into acoustical energy is $E^2 G_p$, the amplitude of the generated acoustic wave (mechanical force) is proportional to the square root of $E^2 G_p$. The transducer's transfer function, as defined above, varies linearly with the duty factor and varies with different piezoelectric materials. This dependence on piezoelectric material can be removed by defining a transducer efficiency as the ratio of the transducer transfer function at a particular duty factor to the value of transducer transfer function at a duty factor of 75 percent. The duty factor of 75 percent is chosen because reflections are low for a shorted comb with 75 percent duty factor. However, any other duty factor could be chosen for normalization. The transducer efficiency also varies, of course, linearly with duty factor as does transducer transfer function but is independent of the piezoelectric material used. The transducer efficiency is most accurately measured on transducers with a large number of sections.

Figure 2A:
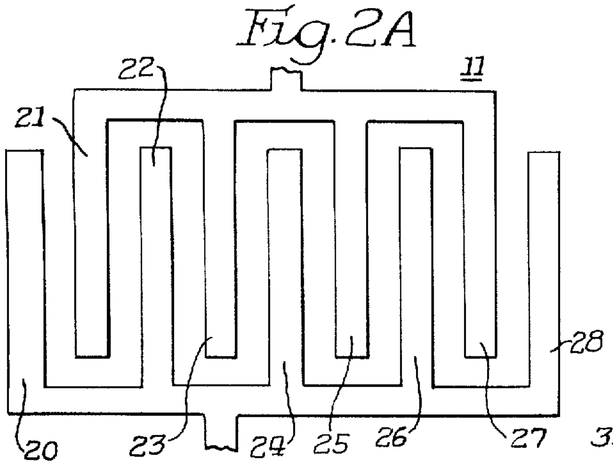
FIG. 2A shows the transmitting transducer only of the SWIF device of FIG. 1.
Figure 1:
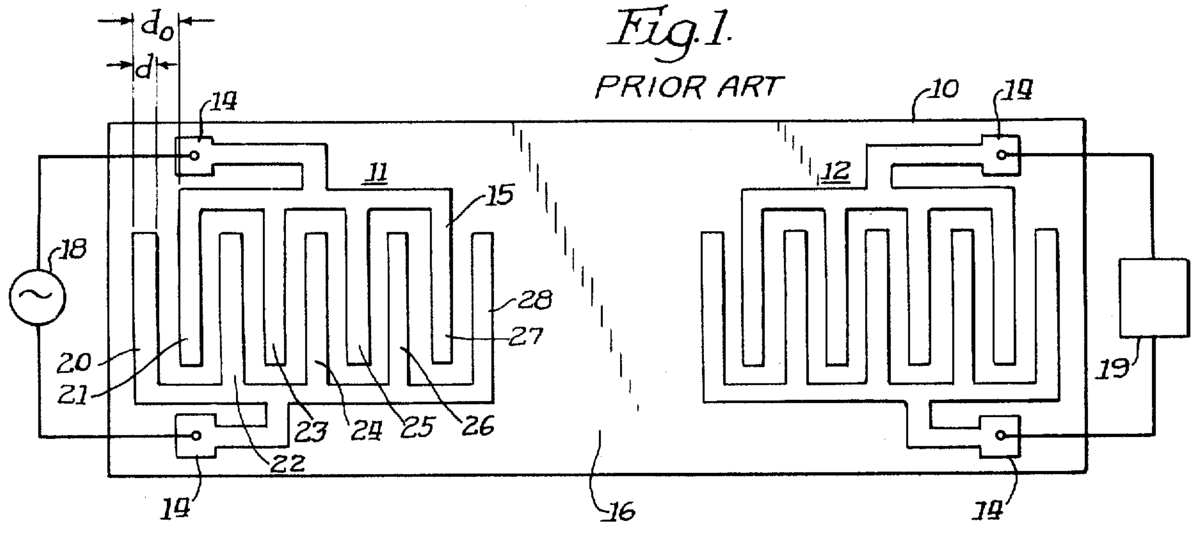
FIG. 1 shows a prior art SWIF device coupled to a voltage source and load.

FIG. 2A shows only transmitting transducer 11 of FIG. 1 which can, for purposes of analysis, be considered to be composed of a number of individual sections each generating or launching a wave which propagates across the transducer and is combined with those from succeeding sections to form the launched wave. The transducer shown has four numbered sections each consisting of two adjacent fingers from one array and the interleaved finger from the other. Fingers 20, 21 and 22 form section 1, fingers 22, 23 and 24 form section 2, fingers 24, 25 and 26 form section 3 and fingers 26, 27 and 28 form section 4. It should be noted that fingers 22, 24 and 26 are common to adjacent sections. Interdigitated transducers of the type shown actually launch two surface waves in opposite directions. However, only the one propagates to the receiving transducer and the other is in practice minimized or eliminated, generally by a suitably placed deposit of acoustic dampening material. For purposes of this discussion, the oppositely directed wave will be ignored.

Figure 2B:
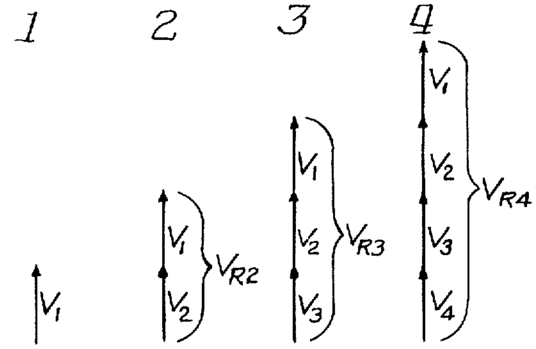
FIGS. 2B through 2E are sequential vector diagrams of surface waves launched by the transducer shown in FIG. 2A.
Figure 2C:
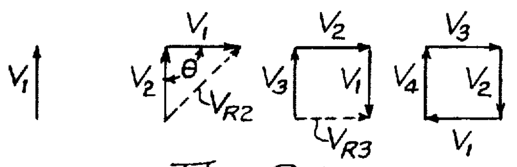

FIGS. 2B through 2E illustrate, by sequential vector addition, the cumulative process involved in the creation and propagation of surface waves by an interdigitated transducer for two different signal frequencies and two mediums of different attenuation characteristics. For FIG. 2B a lossless medium is assumed with the applied signal being at the synchronous or center frequency. The conditions for FIG. 2C are a lossless medium and a signal at a trap frequency; for FIG. 2D, a lossy medium and a signal at synchronous frequency; and for FIG. 2E, a lossy medium and a signal at a trap frequency.

The transducer sections in FIG. 2A are numbered 1 through 4 in the direction of wave propagation and correspondingly the vector representing a section wave contribution bears a subscript indicating the section from which it was launched. For example, the elemental wave contribution generated by section 1 is designated $V_1$ and continues to appear as $V_1$ in the sequential vector diagrams corresponding to sections 2, 3 and 4. Similarly, the wave contribution generated at section 2 is designated $V_2$ and so appears in the vector diagrams at sections 3 and 4. The total wave at each section, that is, the vector sum of the section wave contribution and the arriving wave, bears a subscript R followed by the number of the transducer section. For example, the wave contribution of section 1, $V_1$, arriving at section 2 is added to $V_2$ forming the resultant $V_{R2}$.

The vector diagram of FIG. 2B assumes a surface wave at the synchronous frequency, i.e., having an acoustic wavelength equal to the spacing between the transducer sections. Therefore, each successive section wave contribution is in phase with the arriving wave and adds directly. As a result of this relationship, successively encountered transducer sections produce surface waves which reinforce the propagated wave and, because the medium is assumed to be lossless, there is no attenuation of the wave during its transit across the array and the resultant launched wave $V_{R4}$ is four times the amplitude of the first section wave contribution $V_1$.

In contrast as will be shown, signals having frequencies corresponding to trap frequencies are not reinforced but are instead cumulatively cancelled during launching. Trap frequencies adjacent the passband are equally spaced from the synchronous, or center, frequency and determined by the following equation:

$$f_t = f_o \quad (1 \pm \frac{1}{N})$$

The above equation, in which the trap frequencies ($f_T$) are shown as a function of the synchronous frequency ($f_o$) and the number of transducer sections ($N$), for $N = 4$ yields two trap frequencies, each differing from the synchronous frequency by one quarter of its value.

FIG. 2C shows a vector representation of a surface wave launched by a signal having a frequency equal to the higher trap frequency. It should be obvious, however, that a similar analysis may be performed for the lower trap frequency. A signal at the higher trap frequency causes out-of-phase leading wave components to be added at each successively encountered transducer section. The angle between each section wave component for signals at the higher trap frequency is determined by $$(\theta = \frac{360°}{N})$$

where $N$ is again the number of transducer sections. Applying the above equation to the example where $N$ is equal to four determines that the lead angle ($\theta$) will be 90° and the vector diagram in FIG. 2C describes a square causing it to "close." As a result, the resultant vector $V_{R4}$ representing the launched surface wave is effectively cancelled and has zero amplitude.

The lossless, or zero attenuation, characteristic assumed in FIGS. 2B and 2C is substantially realized by several of the currently used surface wave materials, among which is lithium niobate. While such low loss mediums are advantageous for achieving optimum attenuations at trap frequencies, they present attendant disadvantages of increased reflections and greater cost. It is often desirable, therefore, to use propagating mediums which are lossy, attenuate reflections and are lower in cost.

Figure 2D:
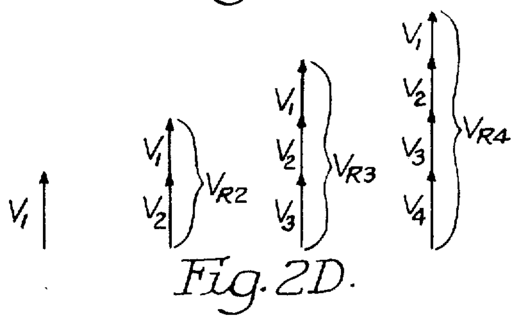

FIG. 2D shows the vector representation of elemental wave components for a signal at the synchronous frequency, resulting in a surface wave having an acoustical wavelength equal to the finger spacing, but on an attenuating or lossy medium, the amplitude of signal applied to the transducer is the same as that used in FIGS. 2B and 2C. As with the lossless medium assumed in FIG. 2B, successive section wave components are in phase with the arriving wave and, therefore, add directly. However, the amplitude of each section wave component is reduced as it propagates due to losses in the medium and the resultant wave at section 4, $V_{R4}$, is not equal to four times the original section wave. The wave component launched by section 1 ($V_1$) travels farthest and is, therefore, reduced the most, while $V_2$ is reduced less and $V_3$ still less. Comparison of FIGS. 2B and 2D shows that the effect of a lossy medium upon signals at the synchronous frequency $f_o$ is to reduce the output of the surface wave amplitude. Reduced output for signals at $f_o$ is not, in most applications, of critical importance and can be tolerated. A more significant degradation of SWIF performance results from the effect of medium losses upon signals at the trap frequencies.

Figure 2E:
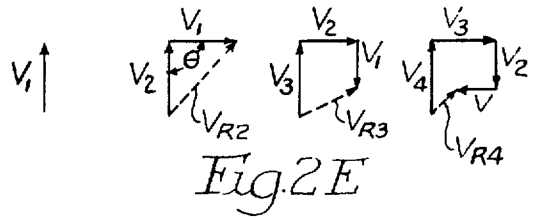

FIG. 2E illustrates the effect of a lossy medium upon signals of the same amplitude as those applied in FIG. 2C at the higher trap frequency. As previously shown for a lossless medium in FIG. 2C, the section wave components are added to the arriving wave which for signals at the higher trap frequency lead the section wave components and, if not attenuated by the medium, would cancel at section 4. However, as can be observed in FIG. 2E, the attenuation of each section wave component does not allow the vector diagram to "close" and causes a nonzero resultant $V_{R4}$. resultant launched waves in FIGS. 2D and 2E shows that while signals at trap frequencies are substantially reduced from those at the synchronous frequency and as a result some trapping does occur, the effectiveness of trapping is degraded by medium losses.

Figure 3:
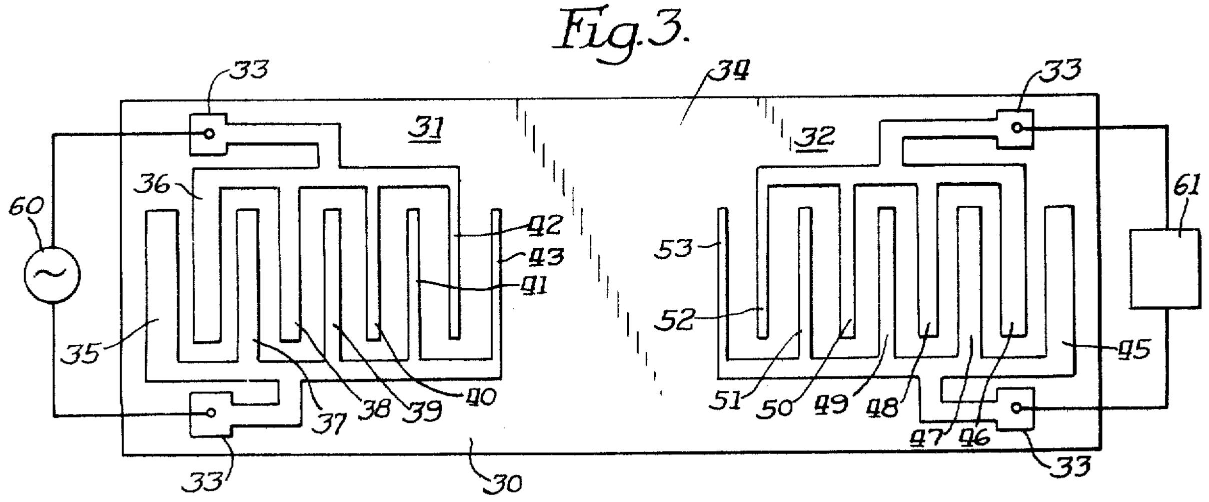
FIG. 3 shows a SWIF device embodying one aspect of the present invention.

One example of the use of a varied duty factor within the transducer array is to provide compensation for trap degradation resulting from the use of a lossy medium. FIG. 3 shows a SWIF device which embodies this aspect of the present invention and comprises a piezoelectric medium 30 having a transmitting transducer 31 and a receiving transducer 32 formed on a propagating surface 34. Transmitting transducer 31 is coupled to a voltage source 60 and receiving transducer 32 is coupled to a load 61. Each transducer comprises a pair of interdigitated comb-like arrays of conductive fingers (35 through 43 inclusive for transducer 31 and 45 through 53 inclusive for transducer 32). It will be noted that the center-to-center spacing between successive fingers is constant across each array and, therefore, the synchronous frequency $f_o$ is the same. The width of finger 35 of transducer 31 is greater than that of finger 36, which in turn is greater than the next adjacent finger 37 and so forth, with finger 43 being the narrowest. Thus the finger width decreases for successive fingers in the direction of wave propagation (left to right in FIG. 3). Conversely, the finger width of transducer 32 increases in the direction of wave propagation and is maximum for fingers most remote from transducer 31. As a result, the duty factors and hence the transducer efficiencies of transducers 31 and 32 vary, being greater at their remote ends and smaller at their near ends. The ranges of duty factor variations are in general selected to make the SWIF compatible with the coupled signal source and load impedance. Of particular importance is the average duty factor which is selected to satisy several design requirements, among them reflection coefficient and insertion loss.

Figure 4A:
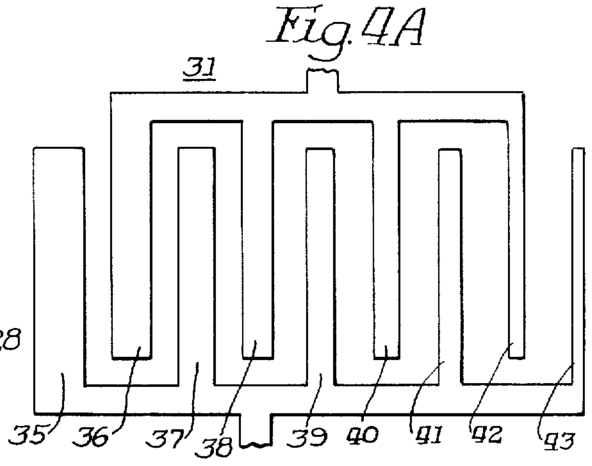
FIG. 4A shows the transmitting transducer of the SWIF of FIG. 3.
Figure 4B:
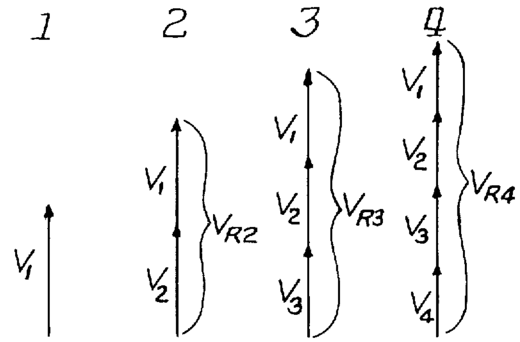
FIGS. 4B and 4C are sequential vector diagrams of surface waves launched by the transducer shown in FIG. 4A.
Figure 4C:
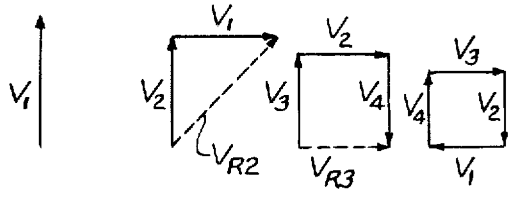

FIG. 4A shows the transmitting transducer 31 of the SWIF depicted in FIG. 3 having an average duty factor of approximately 50 percent. Its four sections are numbered 1 through 4 in the direction of wave propagation. Fingers 35, 36 and 37 form section 1 and generate wave component $V_1$ while fingers 37, 38 and 39 in section 2 generate wave component $V_2$, fingers 39, 40 and 41 in section 3 generate wave component $V_3$ and fingers 41, 42 and 43 in section 4 generate wave component $V_4$. FIGS. 4B and 4C show, in the same manner as in FIGS. 2B and 2C, vector representations of the elemental surface wave components across the same transducer array for signals at the synchronous and higher trap frequencies, respectively.

As discussed in the referent application, for a given voltage across a transducer an increased duty factor and attendant increased transducer efficiency results in the creation of a surface wave of greater amplitude. The elemental wave components for transducer sections 1 through 4 of transducer 31 create surface wave components of greater amplitudes at sections most remote (to the left in FIG. 4A) and of lesser amplitudes by successive sections farther along the array. FIG. 4B shows elemental wave component $V_1$ resulting from a signal at $f_o$ successively reduced during its propagation from section 1 through sections 2 and 3 to section 4 by the loss in the medium and similar reductions of voltages $V_2$ and $V_3$. The initial amplitude of $V_1$ is determined by selecting the duty factor of section 1 such that the launched amplitude of $V_1$ minus the loss in propagation across the array results in a wave component at section 4 which yields the desired $V_4$. Similarly, $V_2$ and $V_3$ are chosen to result in wave components equal to $V_4$ at section 4. To allow effective comparison with previous diagrams, the vector diagrams of FIGS. 4B and 4C are shown normalized and it should be kept in mind that their total amplitude may be less than that shown for a lossless medium.

Comparison of FIG. 2E with FIG. 4C shows that in the latter vectors of equal lengths are added at the final section (4) and the non-zero result in 2E has effectively been eliminated. Thus the vector diagram of FIG. 4C "closes" which is the desired result for signals at the trap frequencies and produces trap responses similar to those derived for a lossless medium shown in FIG. 2C.

The attenuation characteristic of the piezoelectric medium, that is, the reduction in surface wave amplitude, expressed in dB, varies as a function of signal frequency and is, therefore, generally expressed in $dB/\lambda$ where $\lambda$ is the acoustic wavelength of the signal. Signals at different frequencies are reduced by different amounts while propagating across the transducer. Because the cumulative cancellation at trap frequencies results from the relationship between the spacing of transducer fingers and the acoustic wavelength of the signal, the loss compensation discussed above can only be optimum for one of the adjacent trap frequencies with a less than optimum but still significant improvement yielded for the other. An alternative design approach would provide optimization of each transducer for one of the trap frequencies relying on their additive effect to improve both traps.

Figure 5:
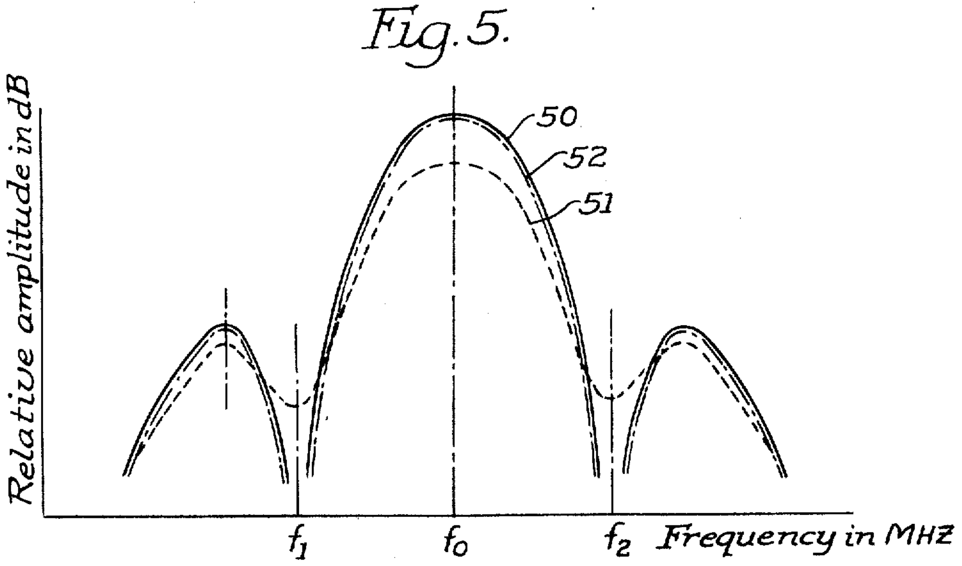
FIG. 5 depicts a family of curves illustrating SWIF device transfer functions and the enhancement obtained with the invention. cl DETAILED DESCRIPTION OF THE INVENTION

FIG. 5 is a plot of the transfer function of the prior art SWIF device of FIG. 1 in which the vertical axis represents the relative amplitude in decibels below maximum and the horizontal axis represents frequency in MHz. $f_0$ is the synchronous or center frequency, that is, the frequency of maximum response and the lower and higher adjacent trap frequencies are $f_1$ and $f_2$, respectively. The solid curve 50 denotes the transfer function of a lossless medium as assumed in FIGS. 2B and 2C. The dotted line curve 51 represents the transfer function 51 of the prior art SWIF with a lossy medium discussed in conjunction with FIGS. 2D and 2E. It is obvious by comparison of the two curves 50 and 51 in FIG. 3 that the attenuation at trap frequencies $f_1$ and $f_2$ is substantially less for a lossy medium. The normalized transfer function for the SWIF, of the invention, using transducers optimized for each trap frequency, is indicated by the dot-dashed curve 52 and closely resembles that derived for the prior art SWIF of FIG. 1 when used with a lossless medium.

What has been disclosed is a novel SWIF device having interdigitated transducers which have a varied duty factor to augment the transfer function. In particular it has been shown that such a duty factor variation can be used to offset degradation of trap attenuation which would otherwise occur as a result of medium attenuation.

While a particular embodiment of the present invention has been shown and described, it will be obvious to those skilled in the art that various changes and modifications may be made without departing from the invention in its broader aspects. Accordingly, the aim in the appended claims is to cover all such changes and modifications that may fall within the true spirit and scope of the invention.

What is claimed is:

1. An acoustic surface wave filter having a predetermined transfer function which defines a major passband essentially centered about a synchronous frequency and adjacent traps, said filter comprising:

a piezoelectric surface wave propagating medium having an attenuation characteristic and defining a propagating surface; and a transmitting transducer and a receiving transducer formed on said surface for respectively launching and receiving surface waves, each transducer including a pair of interdigitated comb-like arrays of spaced electrically conductive fingers, said attenuation characteristic resulting in substantial reduction of surface waves propagating across said transducers, at least one of said transducers having a duty factor gradient having a maximum for conductive fingers farthest from the other of said transducers and a minimum for those nearest said other transducer, said gradient compensating for said surface wave reduction.

2. An acoustic surface wave filter as in claim 1, wherein said attenuation characteristic is constant at any given frequency and said duty factor gradient is linear.

3. An acoustic surface wave filter having a predetermined transfer function comprising:

a piezoelectric surface wave propagating medium having a predetermined attenuation characteristic;

a transmitting transducer and a receiving transducer formed on said surface for respectively launching and receiving surface waves, each transducer including a pair of interdigitated comb-like arrays of electrically conductive fingers spaced on said medium such that signals propagating across said arrays, having frequencies within a selected range defining a passband, are reinforced by successively encountered conductive fingers, while signals adjacent said selected range defining adjacent traps are cumulatively cancelled by successively encountered conductive fingers; and at least one of said transducers having a varied duty factor which is maximum for conductive fingers most remote from the other of said transducers compensating for surface wave amplitude reduction caused by said attenuation characteristic and enhancing said cumulative cancellation of signals at said trap frequencies.

4. An acoustic surface wave filter as in claim 3, wherein one of said transducers has a duty factor gradient selected to optimize said cumulative cancellation of signals at one of said adjacent trap frequencies and the other of said transducers has a duty factor gradient selected to optimize said cumulative cancellation of signals at the other of said adjacent trap frequencies.

* * * * *